(12) United States Patent
Kong

(10) Patent No.: US 7,293,795 B2
(45) Date of Patent: Nov. 13, 2007

(54) HIDDEN AIR BAG APPARATUS

(75) Inventor: Byung Seok Kong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 476 days.

(21) Appl. No.: 10/985,486

(22) Filed: Nov. 10, 2004

(65) Prior Publication Data
US 2005/0121890 A1 Jun. 9, 2005

(30) Foreign Application Priority Data
Nov. 12, 2003 (KR) ............... 10-2003-0079731

(51) Int. Cl.
*B60R 21/20* (2006.01)
(52) U.S. Cl. ............................. 280/732; 280/728.3
(58) Field of Classification Search ............. 280/728.2, 280/732; 180/90; 296/70
See application file for complete search history.

(56) References Cited

U.S. PATENT DOCUMENTS 5,524,923 A * 6/1996 Henseler ................. 280/728.3
2003/0001366 A1 * 1/2003 Debler et al. ............... 280/732
2003/0184063 A1 * 10/2003 Yasuda et al. .............. 280/732
2003/0222436 A1 * 12/2003 Charbonnel ............... 280/728.2
2004/0094939 A1 * 5/2004 Debler et al. ............... 280/732
2004/0214517 A1 * 10/2004 Dietze et al. ............... 454/121
2007/0018440 A1 * 1/2007 Reiter et al. ................ 280/732

* cited by examiner

*Primary Examiner*—Ruth Ilan
(74) *Attorney, Agent, or Firm*—Morgan Lewis Bockius LLP

(57) ABSTRACT

A hidden air bag apparatus for a passenger-side seat of a vehicle includes an inflator disposed in a lower side of an instrument panel of the vehicle, a mounting bracket secured to a cowl cross bar and supporting the inflator, and an air bag configured to be inflated by the inflator. The inflator and the air bag are installed within a defroster air duct disposed under a windshield glass of the vehicle. Because the tearseam formed in the instrument panel can be spaced from where a passenger's head may impact, danger of injury caused by impact between the air bag door and the windshield can be prevented.

14 Claims, 2 Drawing Sheets

HIDDEN AIR BAG APPARATUS

CROSS-REFERENCE TO RELATED APPLICATIONS

This application claims priority of Korean Application No. 10-2003-0079731, filed Nov. 12, 2003, the disclosure of which is incorporated herein by reference.

FIELD OF THE INVENTION

Generally, the present invention relates to an air bag apparatus, and more particularly, to a hidden air bag apparatus for a passenger-side seat of a vehicle.

BACKGROUND OF THE INVENTION

In a typical hidden passenger-side airbag apparatus, a PAB door (passenger-side air bag door) for permitting inflation of an air bag is formed at an inner surface of an instrument panel. Such a door is conventionally made by an injection molding method with a tearseam formed through a scoring method. An air bag apparatus is installed therein.

However, using the conventional arrangement when the PAB door is opened due to air bag inflation, the PAB door impacts against a windshield glass disposed in front of the instrument panel which can cause the windshield to be broken. It is also possible that a passenger can be hurt by breakage of the windshield glass. Therefore, the PAB door is typically formed as far as possible from the windshield glass for preventing impact between the PAB door and the windshield glass.

Recently, an advanced air bag system in which opening of the air bag can be determined by conditions such as whether the seat belt is used has been adopted. In the case that the PAB door is mounted on the instrument panel in front of the passenger, and is far from the windshield glass, the passenger's head can be hurt by tearing of the tearseam of the PAB door The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a hidden air bag apparatus for a passenger-side seat of a vehicle, having non-limiting advantages of positioning the tearseam formed in the instrument panel remote from a position where a passenger's head may impact. Embodiments of the present invention also provide an invisible air bag apparatus for a passenger-side seat of a vehicle which can prevent the danger of damage to the passenger that may be caused by a powerful impact between a PAB door and the windshield glass by moving the position of a tearseam toward the windshield glass.

An exemplary invisible air bag apparatus for a passenger-side seat of a vehicle according to an embodiment of the present invention includes an inflator disposed in a lower side of an instrument panel of the vehicle, a mounting bracket secured to a cowl cross bar and supporting the inflator, and an air bag configured to be able to be inflated by a gas supplied from the inflator, and wherein the inflator and the air bag are installed in a defroster air duct disposed under a front lower portion of a windshield glass of the vehicle.

In a further embodiment, a nozzle hole elongating along a lateral direction of the vehicle is formed in an upper panel of the defroster air duct, and a first tearseam is formed inside the upper panel along the nozzle hole.

In another further embodiment, a chamber for housing the inflator and the air bag is formed in one side of the defroster air duct, and an intercepting plate separates the chamber from the defroster air duct.

In another further embodiment, a second tearseam is formed on a chamber side of the intercepting plate.

In another further embodiment, first and second tearseams are formed by a scoring method, and the first tearseam can be more easily torn than the second tearseam.

In another further embodiment, the defroster air duct is made of a GMT (Glass Mat Thermoplastic) material.

In another further embodiment, the invisible air bag apparatus for a passenger-side seat of the vehicle includes a tempered bracket supporting a front portion of the defroster air duct.

In another further embodiment, the invisible air bag apparatus for a passenger-side seat of a vehicle includes hinge members disposed between the defroster air duct and the upper panel. In this case, the hinge element is preferably made of a high-tension fabric.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
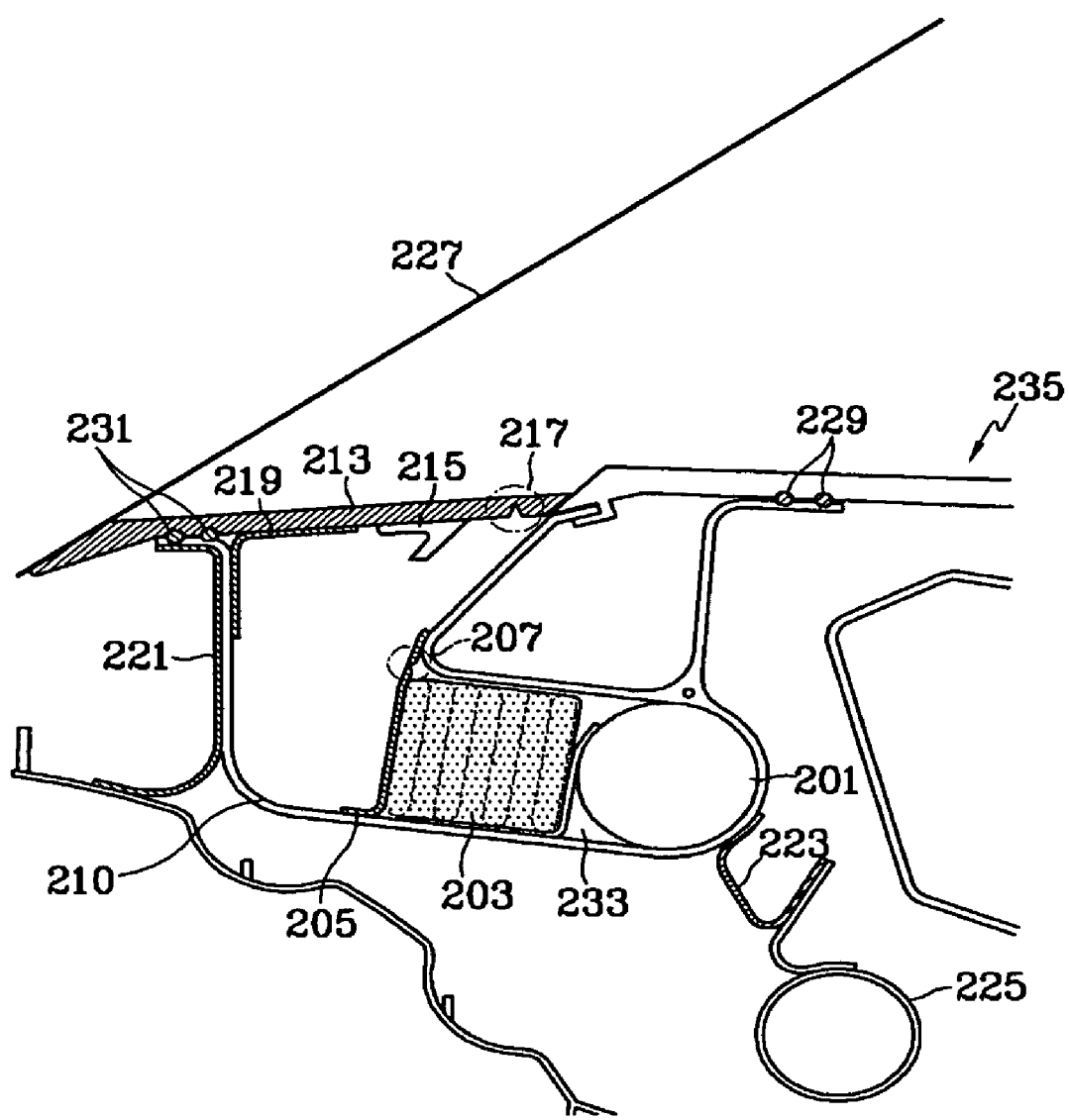
FIG. 1 is a schematic side view of a hidden air bag apparatus for a passenger-side seat of a vehicle according to an embodiment of the present invention.
Figure 2:
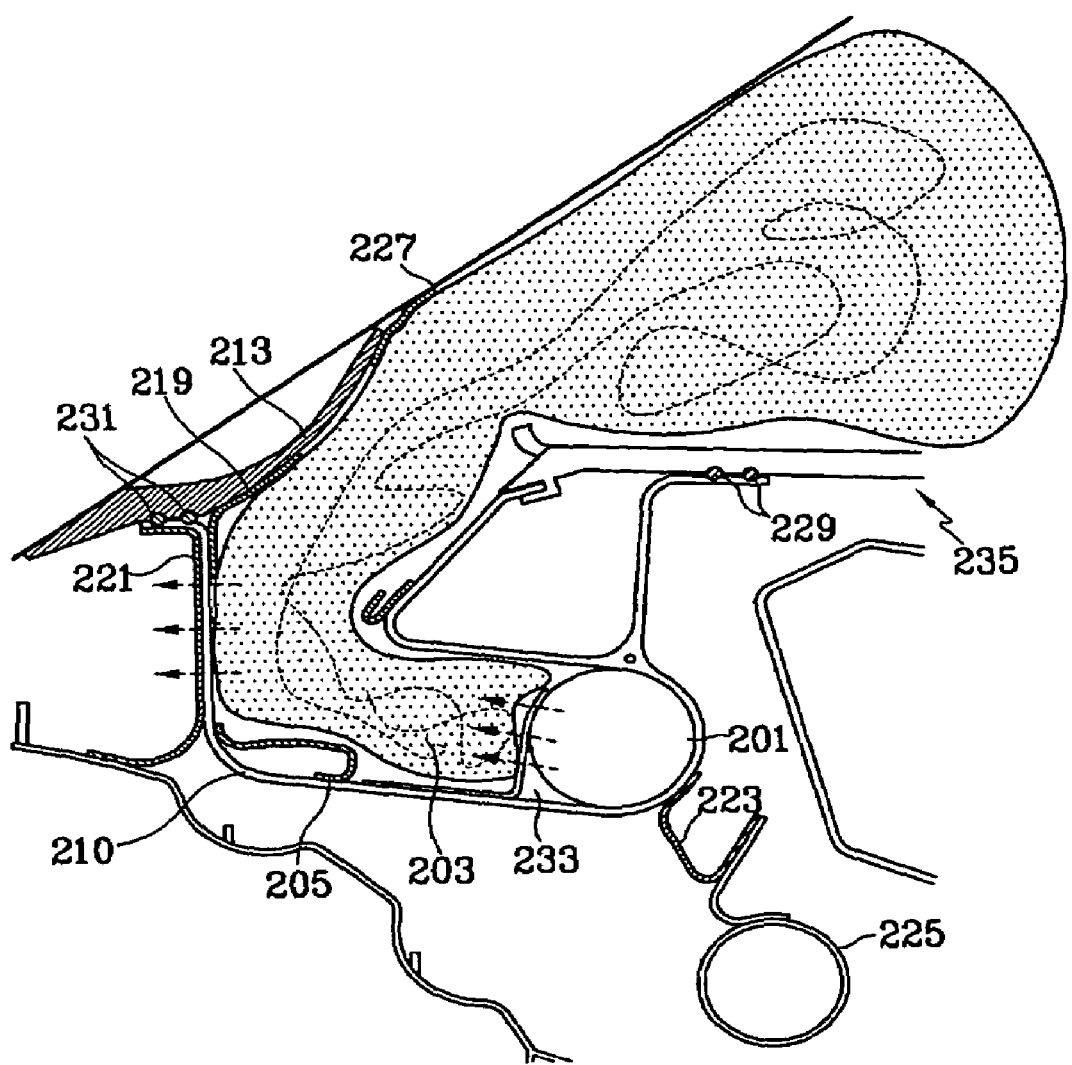
FIG. 2 is a schematic side view illustrating a state in which an air bag according to an embodiment of the present invention has been deployed.

An embodiment of the present invention of a hidden air bag apparatus provided to a passenger-side seat of a vehicle will hereinafter be described in detail w As shown in FIG. 1, the invisible air bag apparatus for a passenger-side seat of a vehicle includes an inflator 201 disposed in a lower side of an instrument panel 235 of a vehicle, a mounting bracket 223 secured to a cowl cross bar 225 and supporting the inflator 201 on one side, and an air bag 203 configured to be able to be inflated by a gas supplied from the inflator 201.

A defroster air duct 210 is disposed under a windshield glass 227, i.e., in a front lower portion of the windshield glass 227 of the vehicle, and air that is to be sent to the windshield glass 227 flows through the defroster air duct 210.

The air duct 210 should be sufficiently strong to resist breakdown thereof by air pressure during inflation. Thus, in one embodiment air duct 210 is made of GMT material and furthermore, a front portion of the air duct 210 is supported by a tempered bracket 221. Other suitably strong materials may be selected.

A defroster nozzle hole 215, which elongates along a lateral direction of the vehicle, is formed in an upper portion of the defroster air duct 210 for flowing the air to the windshield glass 227. A first tearseam 217, having a shape of a groove, is formed inside the upper panel 213 along the nozzle hole 215 so that the first tearseam 217 becomes a boundary of the PAB (passenger-side air bag) door. Tearseam 217 may be formed by scoring.

The air duct 210 is secured to the instrument panel 235 and the upper panel 213. This may be conveniently done at locations 229 and 231. The securing may be accomplished through vibration welding or other suitable means. In addition, a hinge 219 formed with a high-tensioned fabric is mounted in a connecting portion of the upper panel 213 and the air duct 210.

A chamber 233 is formed in one side of the defroster air duct 210, and it houses the inflator 201 and the air bag 203. That is, the inflator 201 and the air bag 203 are disposed within the chamber 233.

Preferably, the air bag 203 disposed in the chamber 223 is folded in a zigzag manner, and an intercepting plate 205 separates the chamber 223 from an inner surface of the air duct 210, i.e., air within the chamber 223 and the air duct 210 are separated from each other by the intercepting plate 205.

The intercepting plate 205 may be made of any suitable material such as polypropylene. A second tearseam 207 is found in a side of the intercepting plate 205 contacting the air bag 203. This tearseam also may be formed as a groove by scoring.

According to an embodiment of the present invention, if a signal for igniting the inflator 201 is inputted in the case that an air bag operating condition is satisfied, the inflator 201 operates to produce air bag gas at a predetermined pressure, and the air bag gas is supplied to the air bag 203.

Therefore, the air bag 203 is inflated by the air bag gas thereby pressing the intercepting plate 205. At that time, the second tearseam 207 formed in the intercepting plate 205 is torn and the air bag 203 is deployed into the air duct 210.

An instant pressure of the air bag inflation acting on the air duct 210 and the chamber 233 formed in one side thereof is supported by the tempered bracket 221 and a mounting bracket 223. In addition, because the air duct 210 is made of a suitably strong material, breakdown of the air duct 210 can be prevented.

Subsequently, the upper panel 213 is pressurized by the deployed air bag 203, and thereby the first tearseam 217 formed inside of the upper panel 213 along the defroster air nozzle hole 215 is torn. Accordingly, the air bag 203 is deployed into a passenger compartment of the vehicle.

In this case, the upper panel 213 rotates toward the windshield glass with respect to the hinge 219. By forming the first tearseam 217 to be torn more easily than the second tearseam 207, i.e., by forming the first tearseam 217 to be torn by a lesser pressure than the second tearseam 207, the breakage of the windshield glass 227 can be prevented even when the upper panel 213 impacts the windshield glass 227. Thus, as compared to a conventional invisible air bag apparatus in which a reaction plate and a tempered panel are mounted in an upper panel, in the present invention impact acting on the windshield glass 227 can be substantially reduced because the reaction plate and the tempered panel are not mounted in the upper panel 213 on which the first tearseam 217 operating as the PAB door is formed.

As showing in FIG. 3, as the PAB door is formed in the front lower portion of the windshield glass 227, impact between a passenger's head and the torn upper panel 213 is prevented, and injury to a passenger by the tearing of the first tearseam 217 is prevented.

According to the invisible air bag apparatus for a passenger-side seat of a vehicle according to an embodiment of the present invention, a position of a tearseam formed in an instrument panel of a vehicle can be apart from a position where a passenger's head may impact.

In addition, in the case of moving the position of the tearseam toward the windshield glass, a danger of the passenger being damage which may be caused by a powerful impact between the PAB door and the windshield glass can be prevented.

In addition, because the tearseam operating as a boundary of the PAB door is formed not in an instrument panel but in a hidden position, the external quality problem like a sink mark or whitening does not occur.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hidden air bag apparatus for a passenger-side seat of a vehicle, comprising:
    an inflator disposed in a lower side of an instrument panel of the vehicle;
    a mounting bracket secured to a cowl cross bar and supporting the inflator;
    an air bag configured to be inflated by gas supplied from the inflator, wherein the inflator and the air bag are installed within a defroster air duct disposed under a windshield glass of the vehicle;
    a nozzle hole elongated along a lateral direction of the vehicle disposed in an upper panel of the defroster air duct;
    a first tearseam disposed inside the upper panel along the nozzle hole;
    a chamber for housing the inflator and the air bag disposed in one side of the defroster air duct;
    an intercepting plate separating the chamber from the defroster air duct; and
    a second tearseam disposed on a chamber side of the intercepting plate.

2. The apparatus of claim 1, wherein the first and second tearseams are formed by a scoring method.

3. The apparatus of claim 2, wherein the first tearseam is formed to be torn more easily than the second tearseam.

4. The apparatus of claim 3, wherein the defroster air duct is made of a GMT (glass mat thermoplastic) material.

5. The apparatus of claim 4, further comprising a tempered bracket supporting a front portion of the defroster air duct.

6. The apparatus of claim 5, further comprising a hinge member disposed between the defroster air duct and the upper panel.

7. The apparatus of claim 6, wherein the hinge member is made of a high-tension fabric.

8. A hidden air bag apparatus for a passenger-side seat of a vehicle, comprising:
- a defroster duct configured to be positioned under a windshield, the duct having an open upper side for communicating with a defroster nozzle hole and a forward side wall;
- a chamber configured and dimensioned for receiving an air bag and air bag inflator formed opposite the defroster duct forward wall;
- a separating member separating the chamber from the defroster duct, said member including a tearseam; and
- an upper panel covering the defroster duct open upper side, said upper panel including a tearseam along a rear edge of said open upper side.

9. The apparatus of claim 8, wherein the upper panel tearseam is configured to tear under less force than the separating member tearseam.

10. The apparatus of claim 8, wherein the defroster duct forward side wall is supported by a bracket such that said side wall and bracket together have sufficient strength to resist a deploying air bag.

11. The apparatus of claim 8, further comprising an air bag and inflator disposed in said chamber.

12. The apparatus of claim 8, wherein said chamber is configured and dimensioned to be positioned forward of and supported by a cowl cross bar of the vehicle.

13. The apparatus of claim 12, further comprising a mounting bracket disposed between the chamber and cowl cross bar.

14. The apparatus of claim 8, further comprising a hinge mounted between the defroster duct forward side wall and the upper panel.

* * * * *